(12) United States Patent
Irimie et al.

(10) Patent No.: US 11,075,943 B2
(45) Date of Patent: Jul. 27, 2021

(54) SYSTEMS AND METHODS FOR AN ARTIFICIAL INTELLIGENCE DRIVEN AGENT

(71) Applicant: KnowBe4, Inc., Clearwater, FL (US)

(72) Inventors: Alin Irimie, Clearwater, FL (US); Stu Sjouwerman, Bellair, FL (US); Greg Kras, Dunedin, FL (US); Eric Sites, Clearwater, FL (US)

(73) Assignee: KnowBe4, Inc., Clearwater, FL (US)

( * ) Notice: Subject to any disclaimer, the term of this patent is extended or adjusted under 35 U.S.C. 154(b) by 0 days.

(21) Appl. No.: 17/107,294

(22) Filed: Nov. 30, 2020

(65) Prior Publication Data

US 2021/0084065 A1   Mar. 18, 2021

Related U.S. Application Data

(63) Continuation of application No. 15/798,187, filed on Oct. 30, 2017, now Pat. No. 10,855,714.
(Continued)

(51) Int. Cl.
*H04L 29/06* (2006.01)
*G06N 5/02* (2006.01)
(Continued)

(52) U.S. Cl.
CPC ........ *H04L 63/1433* (2013.01); *G06F 16/951* (2019.01); *G06F 30/20* (2020.01);
(Continued)

(58) Field of Classification Search
CPC ............. H04L 63/1483; H04L 63/1433; H04L 63/1416; H04L 63/1466; H04L 51/30;
(Continued)

(56) References Cited

U.S. PATENT DOCUMENTS 7,599,992 B2   10/2009   Nakajima
8,041,769 B2   10/2011   Shraim et al.
(Continued)

FOREIGN PATENT DOCUMENTS

WO   WO-2016/164844 A1   10/2016

OTHER PUBLICATIONS

Del Castillo, M. Dolores, Angel Iglesias, and J. Ignacio Serrano. "Detecting phishing e-mails by heterogeneous classification." International Conference on Intelligent Data Engineering and Automated Learning. Springer, Berlin, Heidelberg, 2007. (Year: 2007).*

(Continued)

*Primary Examiner* — Syed A Zaidi
(74) *Attorney, Agent, or Firm* — Foley & Lardner LLP

(57) ABSTRACT

A system and method is described that sends multiple simulated phishing emails, text messages, and/or phone calls (e.g., via VoIP) varying the quantity, frequency, type, sophistication, and combination using machine learning algorithms or other forms of artificial intelligence. In some implementations, some or all messages (email, text messages, VoIP calls) in a campaign after the first simulated phishing email, text message, or call may be used to direct the user to open the first simulated phishing email or text message, or to open the latest simulated phishing email or text message. In some implementations, simulated phishing emails, text messages, or phone calls of a campaign may be intended to lure the user to perform a different requested action, such as selecting a hyperlink in an email or text message, or returning a voice call.

20 Claims, 9 Drawing Sheets

Related U.S. Application Data

(60) Provisional application No. 62/415,390, filed on Oct. 31, 2016.

(51) Int. Cl.
*G06N 20/00* (2019.01)
*G06F 16/951* (2019.01)
*H04L 12/58* (2006.01)
*G06F 30/20* (2020.01)
*H04W 12/122* (2021.01)
*H04W 12/128* (2021.01)

(52) U.S. Cl.
CPC .............. *G06N 5/02* (2013.01); *G06N 20/00* (2019.01); *H04L 51/12* (2013.01); *H04L 63/1466* (2013.01); *H04L 63/1483* (2013.01); *H04W 12/122* (2021.01); *H04L 51/30* (2013.01); *H04W 12/128* (2021.01)

(58) Field of Classification Search
CPC .... H04L 51/12; H04W 12/12; H04W 12/128; H04W 12/122; G06N 20/00; G06N 5/02; G06F 16/951; G06F 30/20
USPC ......................................................... 726/22
See application file for complete search history.

(56) References Cited

U.S. PATENT DOCUMENTS

| | | |
|---|---|---|
| 8,131,655 B1 | 3/2012 | Cosoi et al. |
| 8,170,966 B1 | 5/2012 | Musat et al. |
| 8,464,346 B2 | 6/2013 | Barai et al. |
| 8,484,741 B1 | 7/2013 | Chapman |
| 8,615,807 B1 | 12/2013 | Higbee et al. |
| 8,635,703 B1* | 1/2014 | Belani .................... G06F 21/00 726/25 |
| 8,719,940 B1 | 5/2014 | Higbee et al. |
| 8,793,799 B2 | 7/2014 | Fritzson et al. |
| 8,910,287 B1 | 12/2014 | Belani et al. |
| 8,966,637 B2 | 2/2015 | Belani et al. |
| 9,053,326 B2 | 6/2015 | Higbee et al. |
| 9,246,936 B1 | 1/2016 | Belani et al. |
| 9,253,207 B2 | 2/2016 | Higbee et al. |
| 9,262,629 B2 | 2/2016 | Belani et al. |
| 9,325,730 B2 | 4/2016 | Higbee et al. |
| 9,356,948 B2 | 5/2016 | Higbee et al. |
| 9,373,267 B2 | 6/2016 | Sadeh-Koniecpol et al. |
| 9,398,029 B2 | 7/2016 | Sadeh-Koniecpol et al. |
| 9,398,038 B2 | 7/2016 | Higbee et al. |
| 9,591,017 B1 | 3/2017 | Higbee et al. |
| 9,635,052 B2 | 4/2017 | Hadnagy |
| 9,667,645 B1* | 5/2017 | Belani .................... G06F 21/00 |
| 9,674,221 B1 | 6/2017 | Higbee et al. |
| 9,729,573 B2 | 8/2017 | Gatti |
| 9,813,454 B2 | 11/2017 | Sadeh-Koniecpol et al. |
| 9,870,715 B2 | 1/2018 | Sadeh-Koniecpol et al. |
| 9,876,753 B1 | 1/2018 | Hawthorn |
| 9,894,092 B2 | 2/2018 | Irimie et al. |
| 9,912,687 B1 | 3/2018 | Wescoe et al. |
| 9,942,249 B2 | 4/2018 | Gatti |
| 9,998,480 B1 | 6/2018 | Gates et al. |
| 10,243,904 B1 | 3/2019 | Wescoe et al. |
| 2004/0006747 A1 | 1/2004 | Tyler |
| 2005/0198175 A1 | 9/2005 | Thomas et al. |
| 2005/0262209 A1 | 11/2005 | Yu |
| 2006/0002532 A1 | 1/2006 | Horvitz et al. |
| 2006/0068755 A1* | 3/2006 | Shraim ............... H04L 63/1483 455/410 |
| 2006/0069697 A1 | 3/2006 | Shraim et al. |
| 2007/0142030 A1 | 6/2007 | Sinha et al. |
| 2007/0294352 A1 | 12/2007 | Shraim et al. |
| 2007/0299777 A1 | 12/2007 | Shraim et al. |
| 2009/0259537 A1 | 10/2009 | Veksler et al. |
| 2010/0095374 A1 | 4/2010 | Gillum et al. |
| 2010/0211641 A1 | 8/2010 | Yih et al. |
| 2010/0269175 A1 | 10/2010 | Stolfo et al. |
| 2011/0055922 A1 | 3/2011 | Cohen et al. |
| 2012/0124671 A1 | 5/2012 | Fritzson et al. |
| 2012/0258437 A1 | 10/2012 | Sadeh-Koniecpol et al. |
| 2013/0198846 A1 | 8/2013 | Chapman |
| 2013/0203023 A1 | 8/2013 | Sadeh-Koniecpol et al. |
| 2013/0219495 A1 | 8/2013 | Kulaga et al. |
| 2013/0297375 A1 | 11/2013 | Chapman |
| 2013/0312101 A1 | 11/2013 | Lotem et al. |
| 2014/0096215 A1 | 4/2014 | Hessler |
| 2014/0173726 A1 | 6/2014 | Varenhorst |
| 2014/0199663 A1 | 7/2014 | Sadeh-Koniecpol et al. |
| 2014/0199664 A1 | 7/2014 | Sadeh-Koniecpol et al. |
| 2014/0201835 A1 | 7/2014 | Emigh et al. |
| 2014/0230061 A1 | 8/2014 | Higbee et al. |
| 2014/0230064 A1 | 8/2014 | Higbee et al. |
| 2014/0230065 A1* | 8/2014 | Belani .................. G06Q 10/107 726/25 |
| 2014/0281946 A1 | 9/2014 | Avni et al. |
| 2015/0163242 A1 | 6/2015 | Laidlaw et al. |
| 2015/0180896 A1 | 6/2015 | Higbee et al. |
| 2015/0229664 A1 | 8/2015 | Hawthorn et al. |
| 2015/0229964 A1 | 8/2015 | Misra et al. |
| 2015/0264084 A1* | 9/2015 | Kashyap ............. H04L 63/1483 726/22 |
| 2016/0003689 A1 | 1/2016 | Rankin |
| 2016/0036829 A1 | 2/2016 | Sadeh-Koniecpol et al. |
| 2016/0099963 A1 | 4/2016 | Mahaffey et al. |
| 2016/0142439 A1 | 5/2016 | Goutal |
| 2016/0164898 A1 | 6/2016 | Belani et al. |
| 2016/0173510 A1 | 6/2016 | Harris et al. |
| 2016/0234245 A1 | 8/2016 | Chapman |
| 2016/0261618 A1 | 9/2016 | Koshelev |
| 2016/0301705 A1 | 10/2016 | Higbee et al. |
| 2016/0301716 A1 | 10/2016 | Sadeh-Koniecpol et al. |
| 2016/0308897 A1 | 10/2016 | Chapman |
| 2016/0330238 A1 | 11/2016 | Hadnagy |
| 2016/0368829 A1 | 12/2016 | Minami et al. |
| 2017/0026410 A1 | 1/2017 | Gatti |
| 2017/0078322 A1 | 3/2017 | Seiver et al. |
| 2017/0104778 A1 | 4/2017 | Shabtai et al. |
| 2017/0140663 A1 | 5/2017 | Sadeh-Koniecpol et al. |
| 2017/0193386 A1 | 7/2017 | Qin |
| 2017/0237776 A1 | 8/2017 | Higbee et al. |
| 2017/0244746 A1 | 8/2017 | Hawthorn et al. |
| 2017/0251009 A1 | 8/2017 | Irimie et al. |
| 2017/0251010 A1 | 8/2017 | Irimie et al. |
| 2017/0318046 A1 | 11/2017 | Weidman |
| 2017/0331848 A1 | 11/2017 | Alsaleh et al. |
| 2018/0041537 A1 | 2/2018 | Bloxham et al. |
| 2018/0103052 A1 | 4/2018 | Choudhury et al. |
| 2018/0159888 A1 | 6/2018 | Irimie et al. |
| 2019/0173819 A1 | 6/2019 | Wescoe et al. |
| 2019/0215335 A1 | 7/2019 | Benishti et al. |
| 2019/0245885 A1 | 8/2019 | Starink et al. |
| 2019/0245894 A1 | 8/2019 | Epple et al. |

OTHER PUBLICATIONS

NPL Search Terms (Year: 2021).*
Abu-Nimeh et al., "A Comparison of Machine Learning Techniques for Phishing Detection," eCrime '07: Proceedings of the anti-phishing working groups 2nd annual eCrime researchers summit, 2007, pp. 60-69, ACM Digital Library.
Basnet et al., "Detection of Phishing Attacks: A Machine Learning Approach," Soft Computing Applications in Industry, STUDFUZZ 226, Ed. By B. Prasad, 2008, pp. 373-383.
Final Office Action for U.S. Appl. No. for 15/798,187, dated Aug. 6, 2018.
Final Office Action on U.S. Appl. No. 15/798,187 dated Apr. 24, 2020.
Final Office Action on U.S. Appl. No. 15/798,187 dated Jun. 21, 2019.
Final Office Action on U.S. Appl. No. 15/799,543 dated Jan. 9, 2020.
Final Office Action on U.S. Appl. No. 15/799,549 dated Jan. 30, 2020.

(56) References Cited

OTHER PUBLICATIONS

Jakobsson et al., "Designing Ethical Phishing Experiments: A study of (ROT13) rOnl query features," In the Proceedings of the 15th international conference on World Wide Web (WWW '06), ACM, New York, NY, USA, pp. 513-522.
Non-Final Office Action tor U.S. Appl. No. 15/798,187, dated Feb. 7, 2019.
Non-Final Office Action for U.S. Appl. No. 15/798,187, dated Jan. 11, 2018.
Non-Final Office Action for U.S. Appl. No. 15/799,543, dated Aug. 1, 2019.
Non-Final Office Action for U.S. Appl. No. 15/799,549, dated Sep. 16, 2019.
Non-Final Office Action on U.S. Appl. No. 15/798,187 dated Jan. 30, 2020.
Non-Final Office Action on U.S. Appl. No. 15/799,549 dated Jun. 10, 2020.
Notice of Allowance on U.S. Appl. No. 15/798,187 dated Oct. 15, 2020.
Notice of Allowance on U.S. Appl. No. 15/799,543 dated Jul. 2, 2020.
Notice of Allowance on U.S. Appl. No. 15/799,549 dated Oct. 28, 2020.
Palka et al., "Dynamic phishing content using generative grammars," Software Testing, Verification and Validation Workshops (ICSTW), 2015 IEEE Eighth International Conference, Date of Conference: Apr. 13-17, 2015,IEEE Xplore, pp. 1-8.
Park, "Text-Based Phishing Detection Using a Simulation Model," Open Access Theses. 137. 2017. (96 pp). https://docs.lib.purdue.edu/open_access_theses/137/.
Xiang et al., "CANTINA : A Feature-Rich Machine Learning Framework for Detecting Phishing Web Sites," ACM Trans. Inf. Syst. Secur, vol. 14, Issue 2, Article 21, pp. 1-28.
Yang et al., "Building an Anti-Phishing Game to Enhance Network Security Literacy Learning," Advanced Learning Technologies (ICALT), 2012 12th IEEE International Conference on Advanced Learning Technologies, pp. 121-123.
Final Office Action on U.S. Appl. No. 17/004,950 dated Feb. 16, 2021.
M. Chandrasekaran, K. Narayanan, S. Upadhyaya, Phishing Email Detection Based on Structural Properties, in NYS Cyber Security Conference, 2006 (Year 2006).
Non-Final Office Action on U.S. Appl. No. 17/004,950 dated Nov. 10, 2020.
Park, Gilchan, "Text-Based Phishing Detection Using a Simulation Model" (2013) (Year 2013).
U.S. Office Action on U.S. Appl. No. 17/130,281 dated Apr. 1, 2021.

* cited by examiner

SYSTEMS AND METHODS FOR AN ARTIFICIAL INTELLIGENCE DRIVEN AGENT

RELATED APPLICATION

This application is a continuation of and claims the benefit of and priority to U.S. application Ser. No. 15/798,187, titled "Systems and Methods For An Artificial Intelligence Driven Agent," and filed on Oct. 30, 2017, which claims the benefit of and priority to U.S. Provisional Application No. 62/415,390, titled "Systems and Methods For An Artificial Intelligence Driven Agent," and filed on Oct. 31, 2016, which is incorporated herein by reference in its entirety for all purposes.

FIELD OF THE DISCLOSURE

This disclosure generally relates to systems and methods for performing a simulated phishing attack.

BACKGROUND OF THE DISCLOSURE

It can be useful to perform simulated phishing attacks on an individual or a set of individuals for purposes of extracting information from a device used by the individuals. A phishing attack involves an attempt to acquire sensitive information such as usernames, passwords, credit card details, etc., often for malicious reasons, possibly by masquerading as a trustworthy entity. For example, an email may be sent to a target, the email having an attachment that performs malicious actions when executed or a link to a webpage that either performs malicious actions when accessed or prompts the user to execute a malicious program. Malicious actions may be malicious data collection or actions harmful to the normal functioning of a device on which the email was activated, or any other malicious actions capable of being performed by a program or a set of programs.

BRIEF SUMMARY OF THE DISCLOSURE

A simulated phishing attack may test the readiness of a security system or users of a system to handle phishing attacks such that malicious actions are prevented. A simulated phishing attack may, for example, target a large number of users, such as employees of an organization. Such an attack may be performed by a party friendly or neutral to the targets of the simulated attack. In one type of simulated phishing attack, an attempt is made to lure a user (e.g., an employee of a business entity) into performing a target action. Performing a simulated phishing attack can help expose weaknesses in the security infrastructure meant to protect users and/or devices from phishing attacks or other computerized, cyber, or digital attacks.

A system can be configured to sending multiple simulated phishing emails, text messages, and/or phone calls (e.g., via VoIP) varying the quantity, frequency, type, sophistication, and combination using machine learning algorithms or other forms of artificial intelligence. Such a system may be referred to as an artificial intelligence driven agent, and the set of phishing emails, text messages, and or phone calls may be referred to as a simulated phishing campaign. In some implementations, some or all messages (email, text messages, VoIP calls) in a campaign after the first simulated phishing email, text message, or call may be used to direct the user to open the first simulated phishing email or text message, or to open the latest simulated phishing email or text message. In some implementations, simulated phishing emails, text messages, or phone calls of a campaign may be intended to lure the user to perform a different requested action, such as selecting a hyperlink in an email or text message, or returning a voice call.

In some implementations, the system may adaptively learn the best method (e.g., set of steps) and/or the best combination of messages to get the user to perform the requested action, such as clicking a hyperlink or opening a file. The learning process implemented by the system can be trained by observing the behavior of other users in the same company or in the same industry, by all other users of the system, or by other selected user criteria that matches a subset of other users in the system.

The system can record when and how the action was performed and can produce reports about the actions. The reports can track the number of users the simulated messages were sent to, whether the messages were successfully delivered, whether the user performed a requested action, when the requested action was performed, and the combination and timing of messages that induced the user to perform the requested action. In some implementations, the system may provide training on why the user should not have performed the requested action at the time of the user performs the requested action.

In some aspects, the present solution is directed to a method for determining a sequence and types of communications for a simulated phishing campaign. The method includes storing, by a server to a database, results from a plurality of simulated phishing campaigns communicated to a plurality of users. The plurality of simulated phishing campaigns includes a plurality of different sequences and types of communications to each of the plurality of users. The results may identify activity or behavior of the plurality of users interacting with the plurality of simulated phishing campaigns. The method further includes determining, by a simulated phishing attack manager based on at least the results stored in the database, a sequence and types of communications for a simulated phishing campaign and executing, by the simulated phishing attack manager responsive to the determination, the simulated phishing campaign comprising the sequence and type of communications.

In some embodiments, the plurality of different types of communications comprises two or more of the following: an email, a text or SMS message, a phone call or an Internet based communication. In some embodiments, the results identify behavior or activity of the plurality of users comprising a combination of different types of communications and timing of communications associated with a predetermined action.

In some embodiments, the method includes storing, by the server, results from the plurality of phishing campaigns identifying behavior of when and how one or more of the plurality of users performed an action associated with one or more of the simulated phishing campaigns. In some embodiments, the method includes applying one of an artificial intelligence or machine learning algorithm to the results to make the determination.

In some embodiments, the method includes determining the sequence and type of communications having a predetermined likelihood of the plurality of users to take a predetermined actions, and/or determining one a timing of the sequence or the different types of communications, and/or determining a combination of types of communications for the sequence of communications, and/or determining that a particular type and timing of communications has a predetermined likelihood of a group of users to take a predetermined action and/or determining one or more of the following for the simulated phishing campaign: a quantity, frequency, type or combination of communications.

In some embodiments, the method includes updating the simulated phishing campaign currently executing to perform the sequence and type of communications. In some embodiments, the method includes creating the simulated phishing campaign to comprise the sequence and type of communications. In some embodiments, the method includes monitoring, by the server, results from the simulated phishing campaign. In some embodiments, the method includes identifying, by the simulated phishing attack manager responsive to monitoring, a second sequence and types of communications. In some embodiments, the method includes one of adapting the simulated phishing campaign to use the second sequence and types of communications or generating a second simulated phishing campaign to comprise the second sequence and types of communications.

In some aspects, the present solution is directed to a system for determining a sequence and types of communications for a simulated phishing campaign. The system includes a database configured to store results from a plurality of simulated phishing campaigns communicated to a plurality of users. The plurality of simulated phishing campaigns include a plurality of different sequences and types of communications to each of the plurality of users and the results identify activity or behavior of the plurality of users interacting with the plurality of simulated phishing campaigns. The system includes a simulated phishing attack manager executable on one or more processors, coupled to memory and configured to determine, based on at least the results stored in the database, a sequence and types of communications for a simulated phishing campaign, and execute, responsive to the determination, the simulated phishing campaign comprising the sequence and type of communications.

The system, in some embodiments, includes the plurality of different types of communications comprising two or more of the following: an email, a text or SMS message, a phone call or an Internet based communication. The system, in some embodiments, includes the results identify behavior or activity of the plurality of users comprising a combination of different types of communications and timing of communications associated with a predetermined action. The results from the plurality of phishing campaigns may identify activity or behavior of when and how one or more of the plurality of users performed an action associated with one or more of the simulated phishing campaigns.

In some embodiments, the simulated phishing attack manager is further configured to apply one of an artificial intelligence or machine learning algorithm to the results to make the determination. In some embodiments, the simulated phishing attack manager is further configured to determine the sequence and type of communications having a predetermined likelihood of the plurality of users to take a predetermined action. In some embodiments, the simulated phishing attack manager is further configured to determine one a timing of the sequence or the different types of communications. In some embodiments, the simulated phishing attack manager is further configured to determine a combination of types of communications for the sequence of communications.

In some embodiments, the simulated phishing attack manager is further configured to determine that a particular type and timing of communications has a predetermined likelihood of a group of users to take a predetermined action.

In some embodiments, the simulated phishing attack manager is further configured to determine one or more of the following for the simulated phishing campaign: a quantity, frequency, type or combination of communications.

In some embodiments, the simulated phishing attack manager is further configured to update the simulated phishing campaign currently executing to perform the sequence and type of communications. In some embodiments, the simulated phishing attack manager is further configured to create, the simulated phishing campaign to comprise the sequence and type of communications. In some embodiments, the system includes a server configured to monitor results from the simulated phishing campaign. In some embodiments, the simulated phishing attack manager is further configured to determine responsive to monitoring a second sequence and types of communications.

In some embodiments, the simulated phishing attack manager is further configured to one of adapt the simulated phishing campaign to use the second sequence and types of adapt or generate a second simulated phishing campaign to comprise the second sequence and types of communications.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods of performing simulated phishing attacks.

A. Computing and Network Environment

Figure 1A:
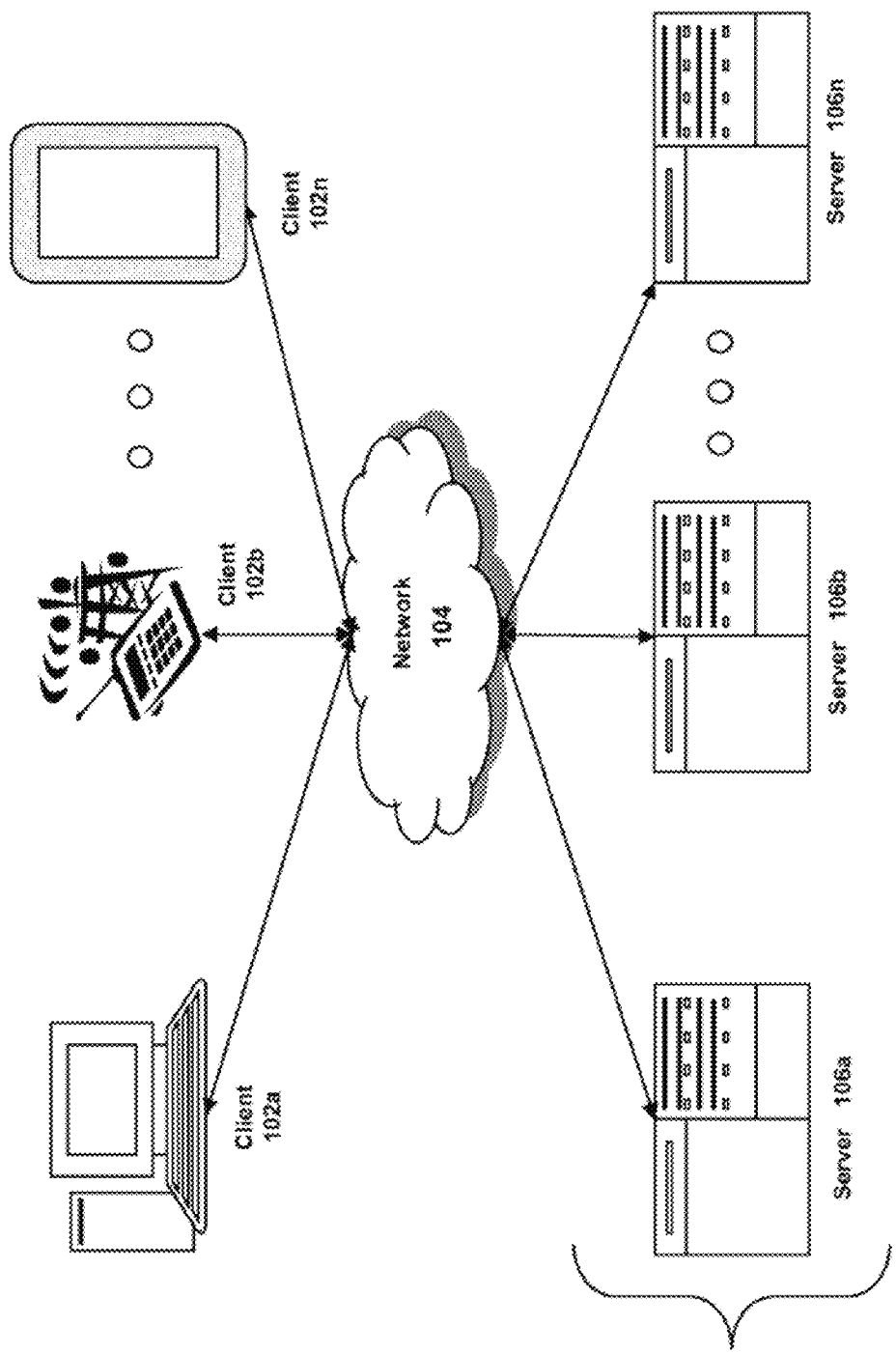
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
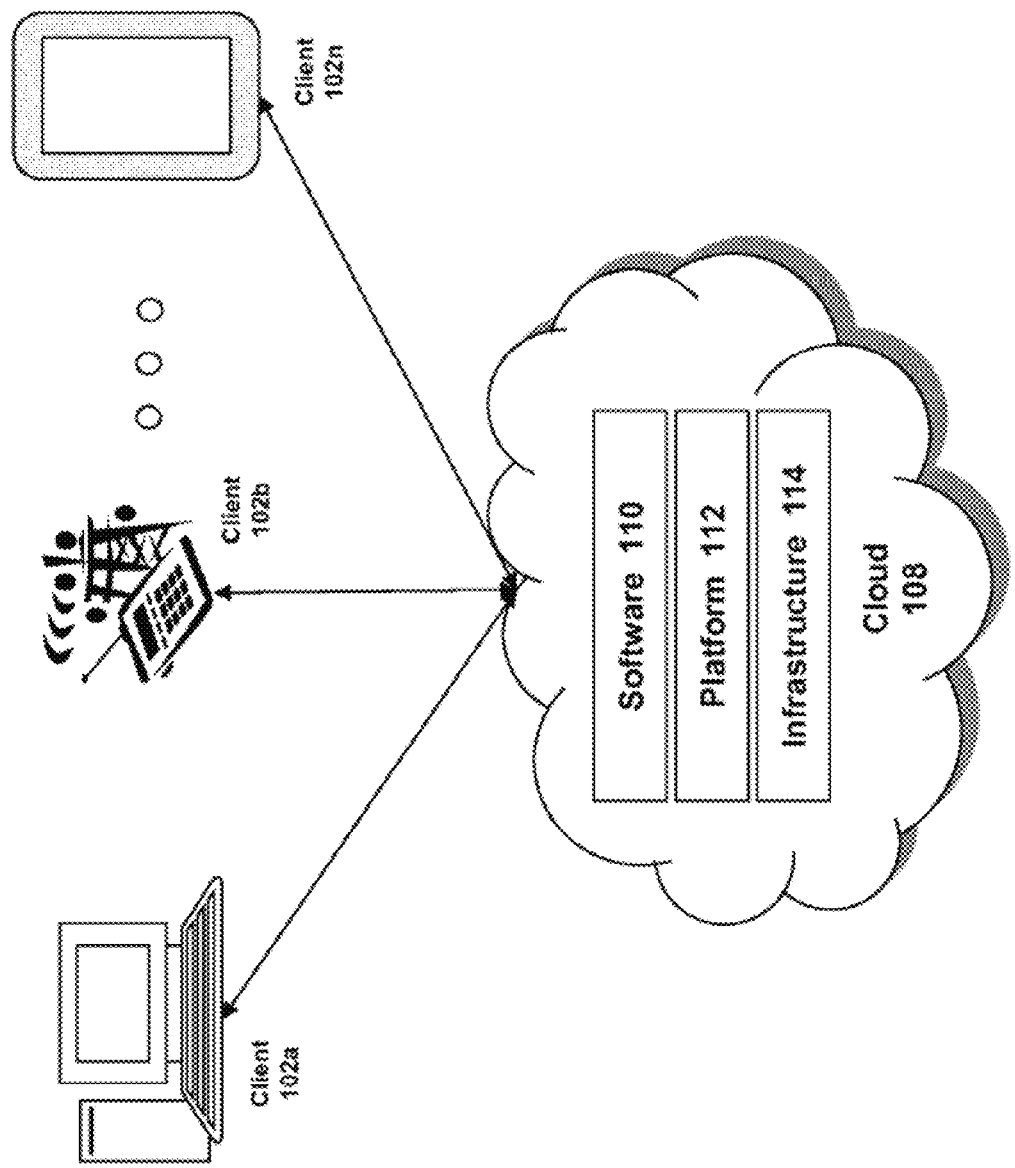
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
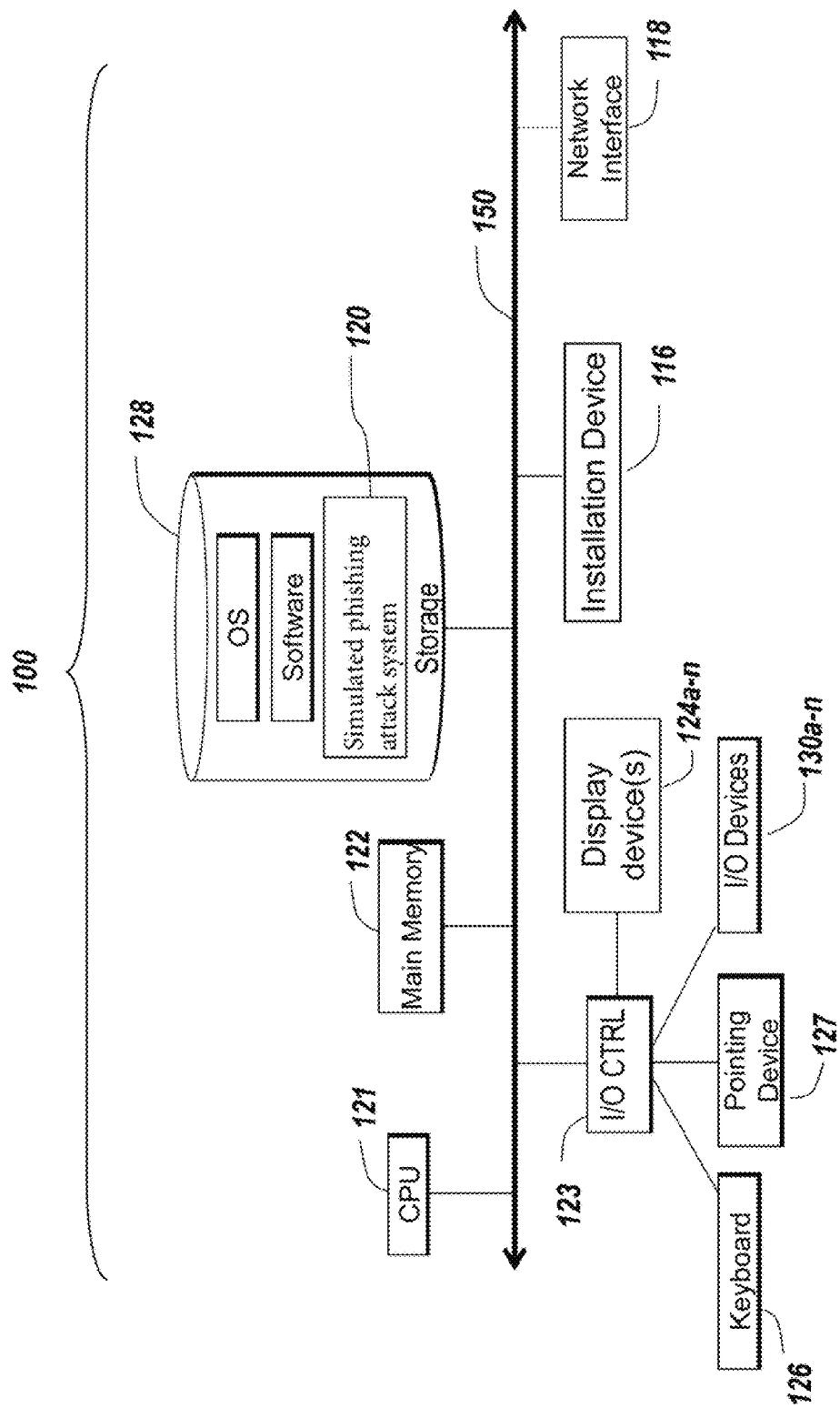
FIGS. 1C and 1D are block diagrams depicting embodiments of computing devices useful in connection with the methods and systems described herein.
Figure 1D:
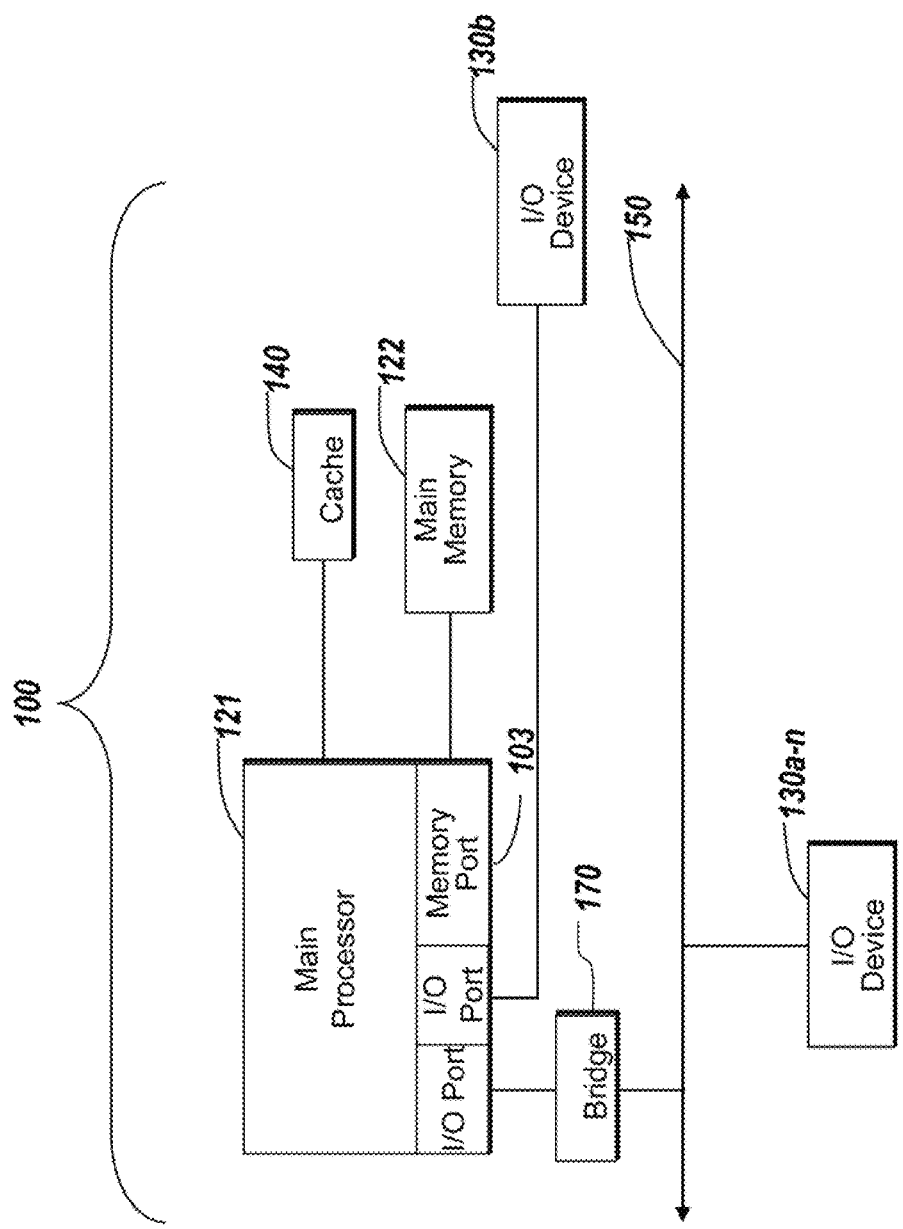

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a simulated phishing attack system 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXEL SENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as a installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, Ti, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is a eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods of Performing Simulated Phishing Attacks

The following describes systems and methods of performing simulated phishing attacks.

A simulated phishing attack may test the readiness of a security system or users of a system to handle phishing attacks such that malicious actions are prevented. A simulated phishing attack may, for example, target a large number of users, such as employees of an organization. Such an attack may be performed by a party friendly or neutral to the targets of the simulated attack. In one type of simulated phishing attack, an attempt is made to lure a user (e.g., an employee of a business entity) into performing a target action. Performing a simulated phishing attack can help expose weaknesses in the security infrastructure meant to protect users and/or devices from phishing attacks or other computerized, cyber, or digital attacks.

A system can be configured to sending multiple simulated phishing emails, text messages, and/or phone calls (e.g., via VoIP) varying the quantity, frequency, type, sophistication, and combination using machine learning algorithms or other forms of artificial intelligence. Such a system may be referred to as an artificial intelligence driven agent, and the set of phishing emails, text messages, and or phone calls may be referred to as a simulated phishing campaign. In some implementations, some or all messages (email, text messages, VoIP calls) in a campaign after the first simulated phishing email, text message, or call may be used to direct the user to open the first simulated phishing email or text message, or to open the latest simulated phishing email or text message. In some implementations, simulated phishing emails, text messages, or phone calls of a campaign may be intended to lure the user to perform a different requested action, such as selecting a hyperlink in an email or text message, or returning a voice call.

In some implementations, the system may adaptively learn the best method (e.g., set of steps) and/or the best combination of messages to get the user to perform the requested action, such as clicking a hyperlink or opening a file. The learning process implemented by the system can be trained by observing the behavior of other users in the same company or in the same industry, by all other users of the system, or by other selected user criteria that matches a subset of other users in the system.

The system can record when and how the action was performed and can produce reports about the actions. The reports can track the number of users the simulated messages were sent to, whether the messages were successfully delivered, whether the user performed a requested action, when the requested action was performed, and the combination and timing of messages that induced the user to perform the requested action. In some implementations, the system may provide training on why the user should not have performed the requested action at the time of the user performs the requested action.

Figure 2:
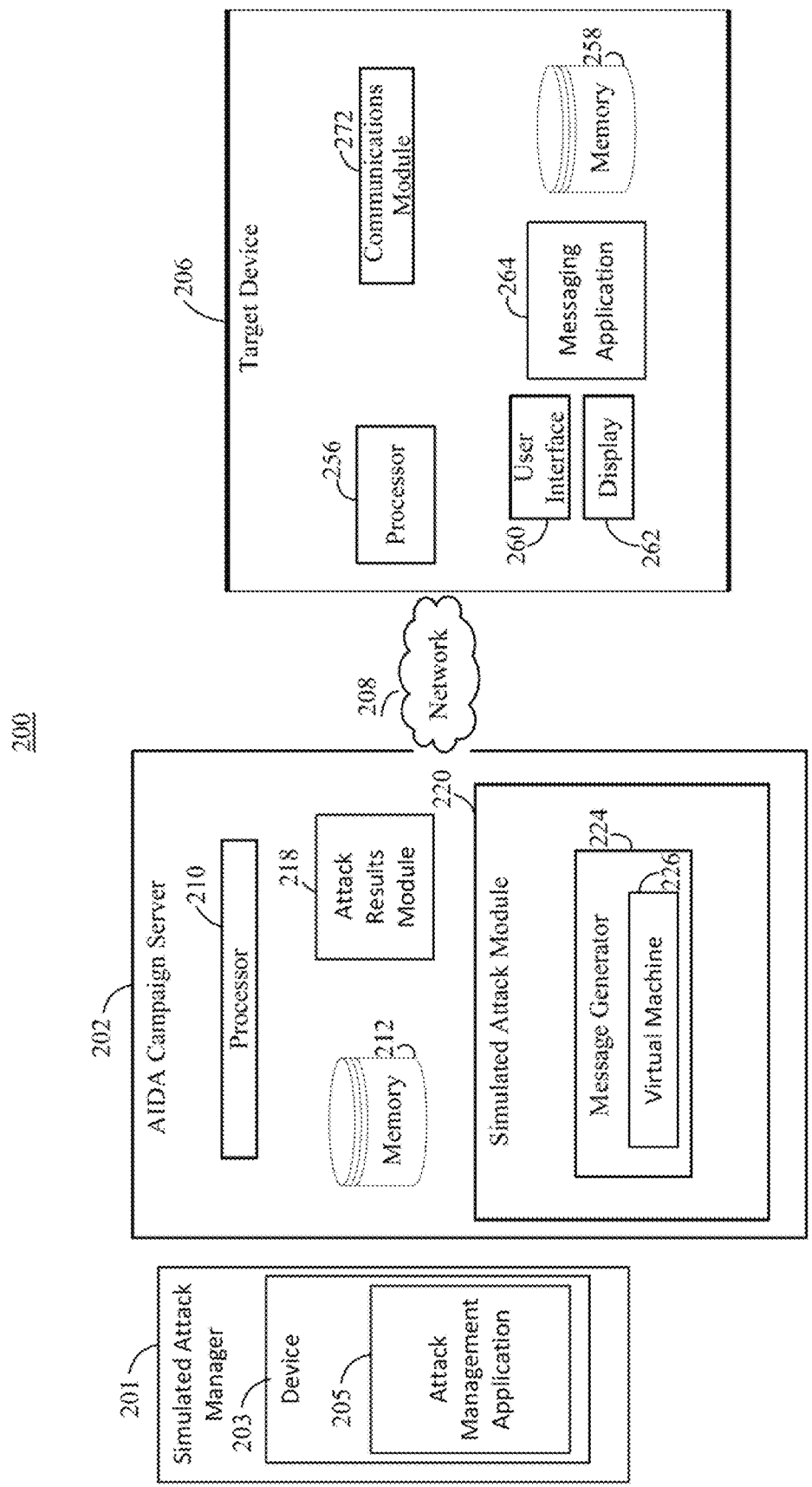
FIG. 2 depicts an implementation of some of the architecture of an implementation of a system capable of performing a simulated phishing attack.

Referring to FIG. 2 in a general overview, FIG. 2 depicts some of the architecture of an implementation of a system 200 capable of performing simulated phishing attack. In some implementations, the system 200 includes a simulated attack manager 201, a ADA campaign server 202, a target device 206, and a network 208 allowing communication between these system components.

In an implementation, a simulated attack manager 201, also referred to as a simulated phishing attack manager, may be e.g., a security manager, a third party security consultant, a risk assessor, or any other party. The simulated attack manager 201 may wish to direct a simulated phishing attack by interacting with a AIDA campaign server 202 through an attack management application 205 installed on a device 203. The device 203 may be, for example, a desktop computer, a laptop computer, a mobile device, or any other suitable computing device. The attack management application 205 may be e.g., an application on a device that allows for a user of the device to interact with the AIDA campaign server 202 for e.g. purposes of tailoring and/or executing a simulated phishing attack and/or viewing and/or processing and/or analyzing the results of a phishing attack.

In an implementation, the attack management application 205, when executed on the device 203, causes e.g. a graphical user interface (GUI) to be displayed to e.g. the simulated attack manager 201. Examples of GUIs that may be displayed in connection with the attack management application 205 are described further below in connection with FIGS. 3A-3C. In other implementations, the attack management application 205 allows for user input through a non-graphical user interface, e.g. a user interface that accepts text or vocal input without displaying an interactive image. A GUI may be displayed on a screen of a mobile phone, or a monitor connected to a desktop or laptop computer, or may be displayed on any other display. The user may interact with e.g. the GUI on the device by typing, clicking a mouse, tapping, speaking, or any other method of interacting with a user interface. The GUI on the device may be a web-based user interface provided by a web browser (e.g. GOOGLE CHROME, Microsoft INTERNET EXPLORER, or Mozilla Firefox provided by Mozilla Foundation of Mountain View, Calif.), or may be an application installed on a user device capable of opening a network connection to AIDA campaign server 202, or may be any other type of interface.

In some implementations, the simulated attack manager 201 may make choices concerning how a simulated phishing attack is to be carried out. For example, a graphical user interface run by the attack management application 205 may be displayed to the simulated attack manager 201 on a display of the device 203. The simulated attack manager 201 may input parameters for the attack that affect how it will be carried out. For example, an administrator may input parameters for the attack (e.g., a start time, end time, and targeted user group) that affect how it will be carried out.

In some implementations, system 200 includes a AIDA campaign server 202. The AIDA campaign server 202 may be a part of a cluster of AIDA campaign servers. In some implementations, tasks performed by the AIDA campaign server 202 may be performed by a plurality of AIDA campaign servers. These tasks may be allocated among the cluster of servers by an application, service, daemon, routine, or other executable logic for task allocation. The AIDA campaign server 202 may include a processor 210 and memory 212.

In some implementations, the AIDA campaign server 202 may include a simulated attack module 220. The simulated attack module 220 may manage various aspects of a simulated phishing attack. For example, the simulated attack module 220 may process input from the simulated attack manager 201, may provide access as needed to various applications, modules, and other software components of the AIDA campaign server 202 to other various applications, modules, and other software components of the AIDA campaign server 202, may monitor and control timing of various aspects of a simulated attack, may process requests for access to attack results, or may perform other tasks related to the management of a simulated attack.

In an implementation, the simulated attack module 220 includes a message generator 224. The message generator 224 may be integrated with the memory 212 so as to provide the message generator 224 accesses to parameters associated with messaging choices made for a particular simulated attack by e.g. the simulated attack manager 201. The message generator 224 may be an application, service, daemon, routine, or other executable logic for generating messages. The messages generated by the message generator 224 may be of any appropriate format. For example, they may be email messages, text messages, messages used by particular messaging applications such as, e.g., WhatsApp™, or any other type of message. Message type to be used in a particular attack may be selected by e.g. a simulated attack manager 201 using attack management application 205. The messages may be generated in any appropriate manner, e.g. by running an instance of an application that generates the desired message type, such as running e.g. a Gmail™ application, Microsoft Outlook™, WhatsApp™, a text messaging application, or any other appropriate application. The messages may be generated by running a messaging application on e.g. a virtual machine 226, or may simply be run on an operating system of the AIDA campaign server 202, or may be run in any other appropriate environment. In some implementations, the message generator may generate automated voice calls.

The system 200 includes also the target device 206. As described above, a target may be any target of a simulated phishing attack. For example, the target may be an employee, member, or independent contractor working for an organization that is e.g. performing a security checkup or conducts ongoing simulated phishing attacks to maintain security. The target device 206 may be any device used by the target. The target need not own the device for it to be considered a target device 206. The target device 206 may be any computing device, e.g. a desktop computer, a laptop, a mobile device, or any other computing device. In some implementations, the target device 206 may be a server or set of servers accessed by the target. For example, the target may be the employee or a member of an organization. The target may access a server that is e.g. owned or managed or otherwise associated with the organization. Such a server may be a target device 206.

In some implementations, the target device 206 may include a processor 256 and memory 258. The target device 206 may further include a user interface 260 such as, e.g., a keyboard, a mouse, a touch screen, or any other appropriate user interface. This may be a user interface that is e.g. connected directly to a target device 206, such as, for example, a keyboard connected to a mobile device, or may be connected indirectly to a target device 206, such as, for example, a user interface of a client device used to access a server target device 206. The target device 206 may include a display 262, such as, e.g., a screen, a monitor connected to the device in any manner, or any other appropriate display.

In some implementations, the target device 206 may include a messaging application 264. The message viewing application 264 may be any application capable of viewing, editing, and/or sending messages. For example, the messaging application 264 may be an instance of an application that allows viewing of a desired message type, such as any web browser, a Gmail™ application, Microsoft Outlook™, WhatsApp™, a text messaging application, or any other appropriate application. In some implementations, the messaging application 264 can be configured to display simulated attack emails. Furthermore, the messaging application 264 can be configured to allow the target to generate reply messages in response to the messages displayed by the messaging application 264.

In some implementations, the target device 206 may include a communications module 272. This may be a library, application programming interface (API), set of scripts, or any other code that may facilitate communications between the target device 206 and any of the simulated attack server 202, a third party server, or any other server. In some implementations, the communications module 272 determines when to transmit information from the target device 206 to external servers via a network. In some implementations, the information transmitted by the communications module 272 may correspond to a message, such as an email, generated by the messaging application 264.

In implementations, the simulated attack server 202 includes an attack results module 218. The attack results module 218 may include a database of the results of a one or more simulated phishing attacks. For example, the attack results module 218 may include data collected from targets (such as multiple instances of devices similar to the target device 206), records of failures such as a listing of which targets replied to a simulated attack email, systemic or other security measures in place during the simulated phishing attacks, time or date logs, user identifiers, data detailing the results or analysis of attack results including data that indicates associations between attack results, and any other appropriate data. The attack results module 218 may be integrated with the attack management application 205 such that the simulated attack manager 201 may view, save, share, print, or perform any other appropriate action with the attack results. The attack results module 218 may perform analysis on the attack results, possibly upon request of the simulated attack manager 201. For example, this analysis may include determining which users are a security risk based on e.g. having a number of failures above a predetermined threshold, whether certain security systems in place are effective by e.g. correlating the presence of such security systems with a lower than average incidence of failures. The attack results module 218 may allow an attack manager to view, on a graphical user interface run by the attack management application 205, e.g. a timeline of overall failure rates, which may be useful in e.g. helping to determine whether a security policy that was instituted at a particular time was effective in improving security.

In some implementations, reply emails sent from the target device to the simulated attack server can be processed by the simulated attack module 220. For example, the simulated attack module 220 can be configured to process reply emails received from one or more target devices 206 to determine the identities of the targets who sent the reply emails. In some implementations, the identities of the targets may be determined based in part on the unique identifiers included within each reply email received by the simulated attack server.

In some implementations, the simulated attack module 220 can use information generated by the attack results module 218 to update or revise an ongoing simulated phishing campaign. For example, in some implementations, the simulated attack module 220 can implement an artificial intelligence algorithm or machine learning technique in order to adjust the parameters of a campaign. In some implementations, the simulated attack module 220 may use information from the attack results module 218 to determine which types and/or sequences of simulated attacks have the highest likelihood of inducing a user to perform a requested action. The simulated attack module may then implement a similar sequence of attacks in a future campaign, in order to increase the effectiveness of the future campaign.

In some implementations, the simulated attack module 220 may note similarities between certain users or sets of users, and may use such information to determine how a user or a set of users should be targeted with during a campaign. For example, the simulated attack module 220 may determine that a particular type, sequence, or timing of messages in a simulated attack appears to be particularly effective for luring sales representatives into performing a targeted action. Based on this information, the simulated attack module 220 may replicate that type, sequence, or timing of messages in a future simulated campaign against another user who is also a sales representative. Thus, the simulated attack module may continuously monitor results determined by the attack results module, and may apply artificial intelligence or other machine learning techniques to the results in order to generate more effective campaigns in the future.

Figure 3A:
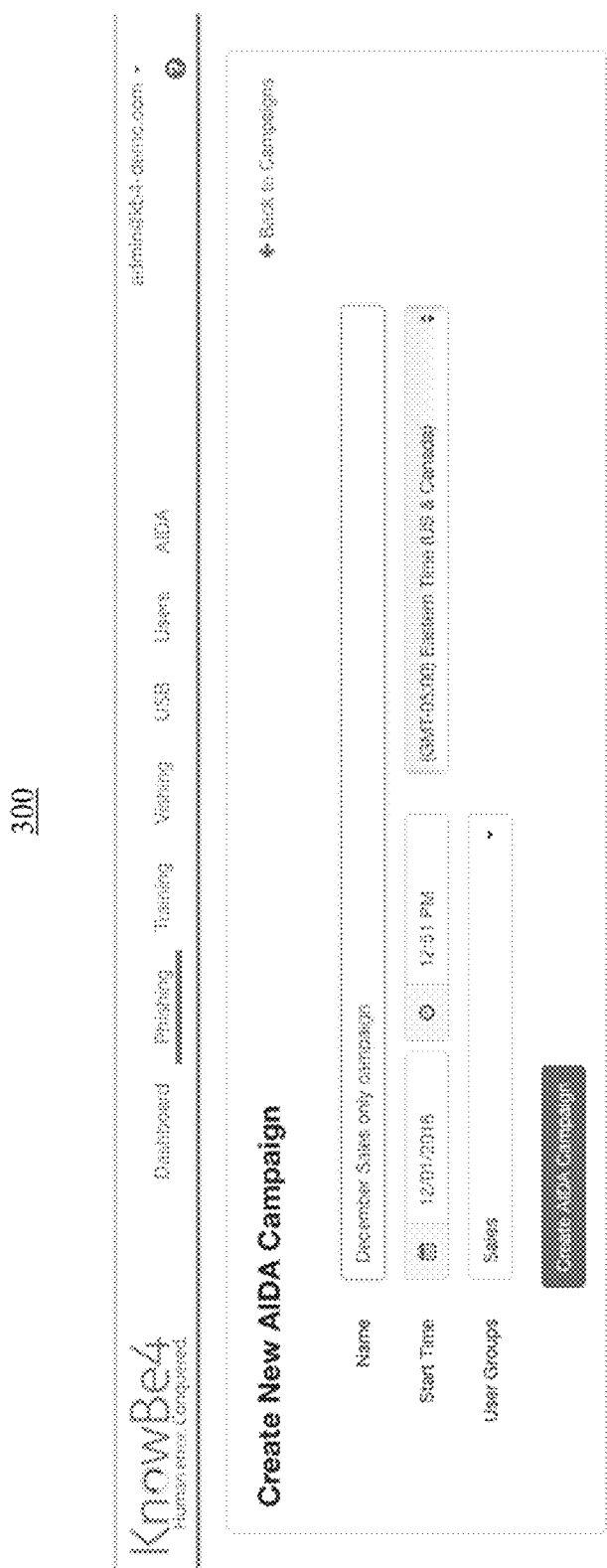
FIGS. 3A-3C depict a series of example screenshots of graphical user interfaces of an application for generating and viewing the results of a simulated phishing attack campaign.
Figure 3B:
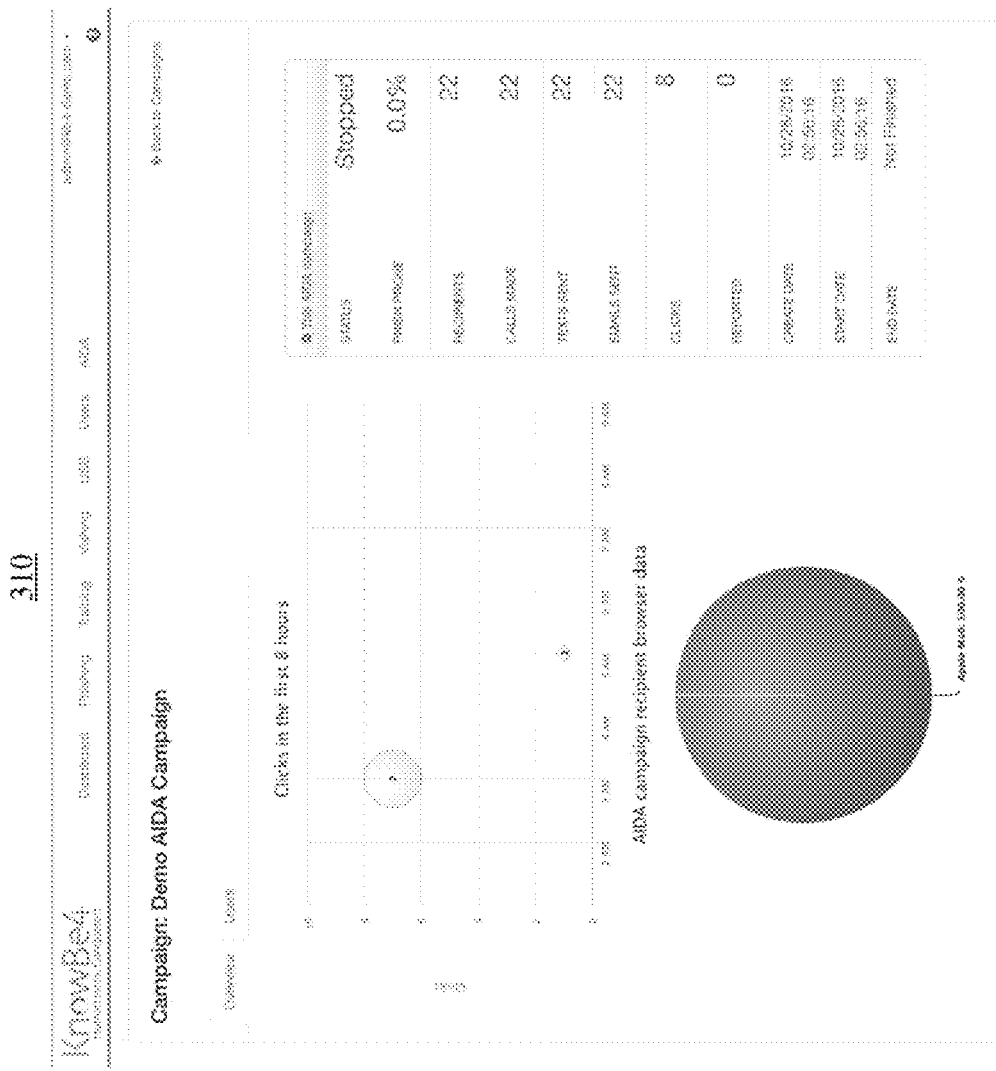
Figure 3C:
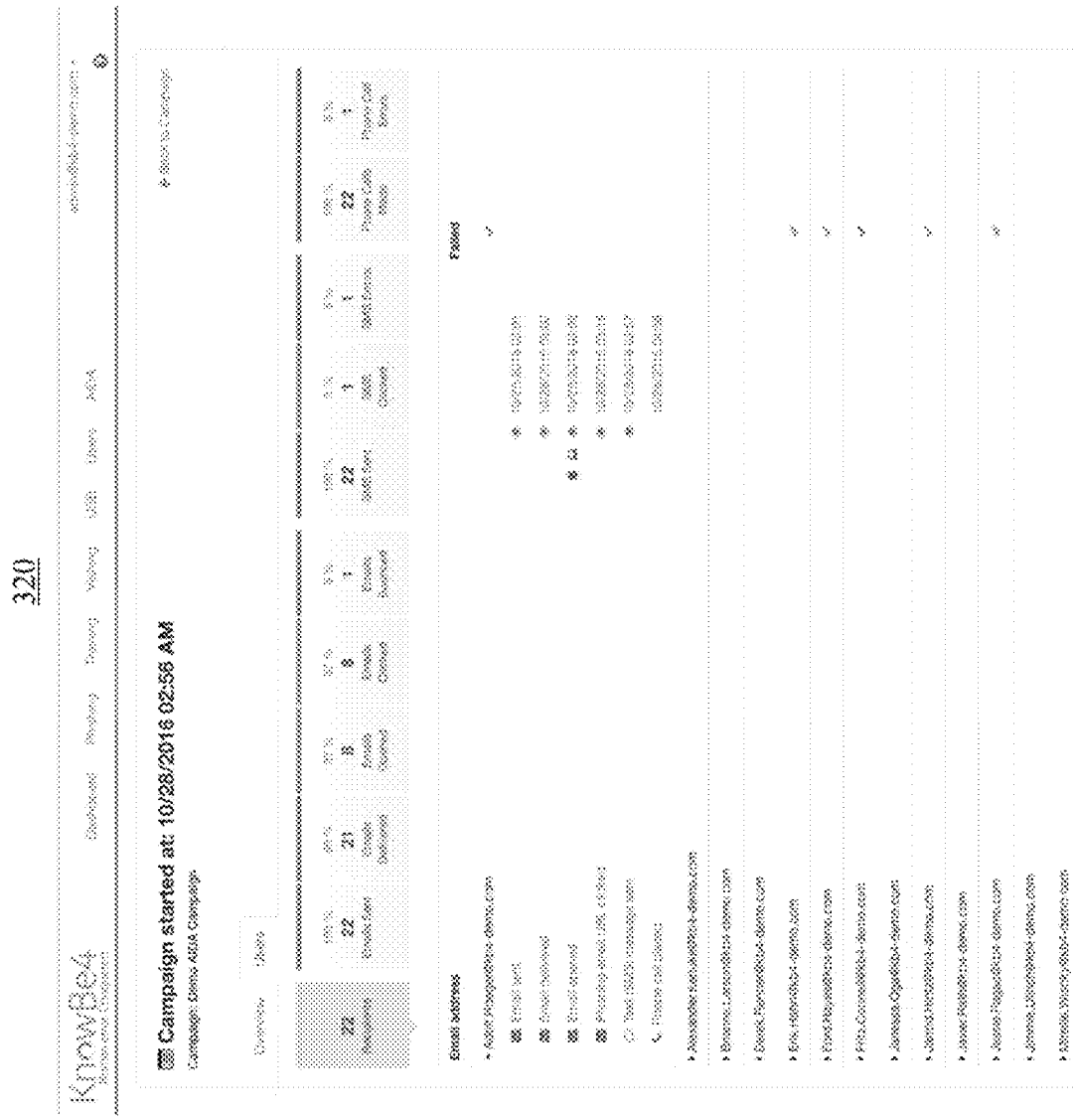

FIGS. 3A-3C depict a series of example screenshots of graphical user interfaces (GUIs) 300, 310, and 320 of an application for generating and viewing the results of a simulated phishing attack campaign. Referring now to FIG. 3A, a screenshot of a GUI 300 is shown. In some implementations, the GUI 300 can be displayed, for example, on a display screen of the campaign manager server 202 shown in FIG. 2. The GUI 300 can provide an administrator with a simple way to generate a simulated phishing campaign. For example, the GUI 300 includes a Name text field into which the administrator can enter text corresponding to a desired name for the new campaign to be created. The GUI also includes fields for allowing an administrator to enter a Start Time for the new campaign, including a date, a time, and a time zone. A User Groups dropdown menu can allow an administrator to select one or more user groups who should be targeted by the new campaign. In the example shown in FIG. 3, the administrator has selected the Sales user group, although any other user group or set of user groups could be targeted in other implementations. The GUI 300 includes a Create AIDA Campaign button. In some implementations, the administrator may select the Create AIDA Campaign button after information has been correctly entered into the Name, Start Time, and User Groups fields. When the administrator selects the Create AIDA Campaign button, the AIDA Campaign Manager Server 202 shown in FIG. 2 may generate a new campaign, based on the information entered into the text fields by the user.

FIG. 3B depicts a screenshot of a GUI 310, which can provide a summary of the campaign to an administrator after the campaign has started. The GUI 310 includes an Overview tab, which is active in FIG. 3B, as well as a Users tab, which is described further below in connection with FIG. 3C. The GUI 310 provides a graph showing time along the x-axis and number of clicks along the y-axis. For example, in some implementations, the campaign may be intended to lure users into clicking a link contained within an email or a text message. The timing of clicks made by users can be presented to show the administrator how many users clicked the link, and at what time the links were clicked. As shown, in this example, seven users clicked the link around 3:00 A.M., while one user clicked the link around 5:00 A.M.

The GUI 310 also includes a status box showing various parameter-value pairs relating to the ongoing campaign. For example, the status box can show an overall status for the campaign (e.g., whether the campaign is stopped or in progress), a percentage of users that are determined to be "phish prone" based on how many users have clicked links associated with the campaign, a number of recipients for the campaign, a number of calls made during the campaign, a number of text messages sent during the campaign, a number of emails sent during the campaign, a total number of clicks (or other target actions) performed by users during the campaign, and a total number of users who have reported communications made during the campaign as potentially suspicious. In addition, the status box includes information presenting the date on which the campaign was created, the date on which the campaign started, and the date on which the campaign ended.

The GUI 310 also includes a pie chart showing recipient browser data for the campaign. In this example, the pie chart can inform the administrator that 100% of users received communications during the campaign via Apple Mail. In some other implementations, the pie chart may inform the administrator of other email platforms or web browser applications that were used by users to receive communications during the campaign.

As described above, FIG. 3C depicts a GUI 320 showing information contained within the Users tab that is shown in the GUI 310 of FIG. 3B. The GUI 320 provides information to the administrator relating to how the users targeted by the campaign have responded to communications sent during the campaign. For example, the GUI 320 provides information corresponding to the number of emails sent, the number of emails delivered, the number of emails opened by users, the number of emails clicked by users, and the number of emails "bounced" or returned as undeliverable. Similar information is provided regarding short message service (SMS) messages (i.e., text messages) and phone calls made during the campaign. For example, the GUI 320 shows the number of SMS messages sent, the number of SMS messages clicked by users, and the number of SMS errors. The GUI 320 also shows the number of phone calls made and the number of phone call errors.

The GUI 320 also provides a timeline of information relating to each user targeted during the campaign. Users are sorted according to their email address. For example, as shown, the user associated with the email address "Adolf.Hoeger@kb4-demo.com" was sent an email 3:01 on Oct. 28, 2016. The GUI 320 further displays the times and dates at which the email was delivered and opened, and the time at which a link within the email was clicked. Similar timing information is shown for the time at which an SMS message was sent to the user and the time at which a phone call was placed to the user. To view such information for each user, an administrator can select the user's email address within the GUI 320. The GUI 320 also displays a check mark next to the email addresses of users who failed the campaign, e.g. by selecting a link within a simulated phishing email or a simulated phishing SMS message associated with the campaign.

Figure 4:
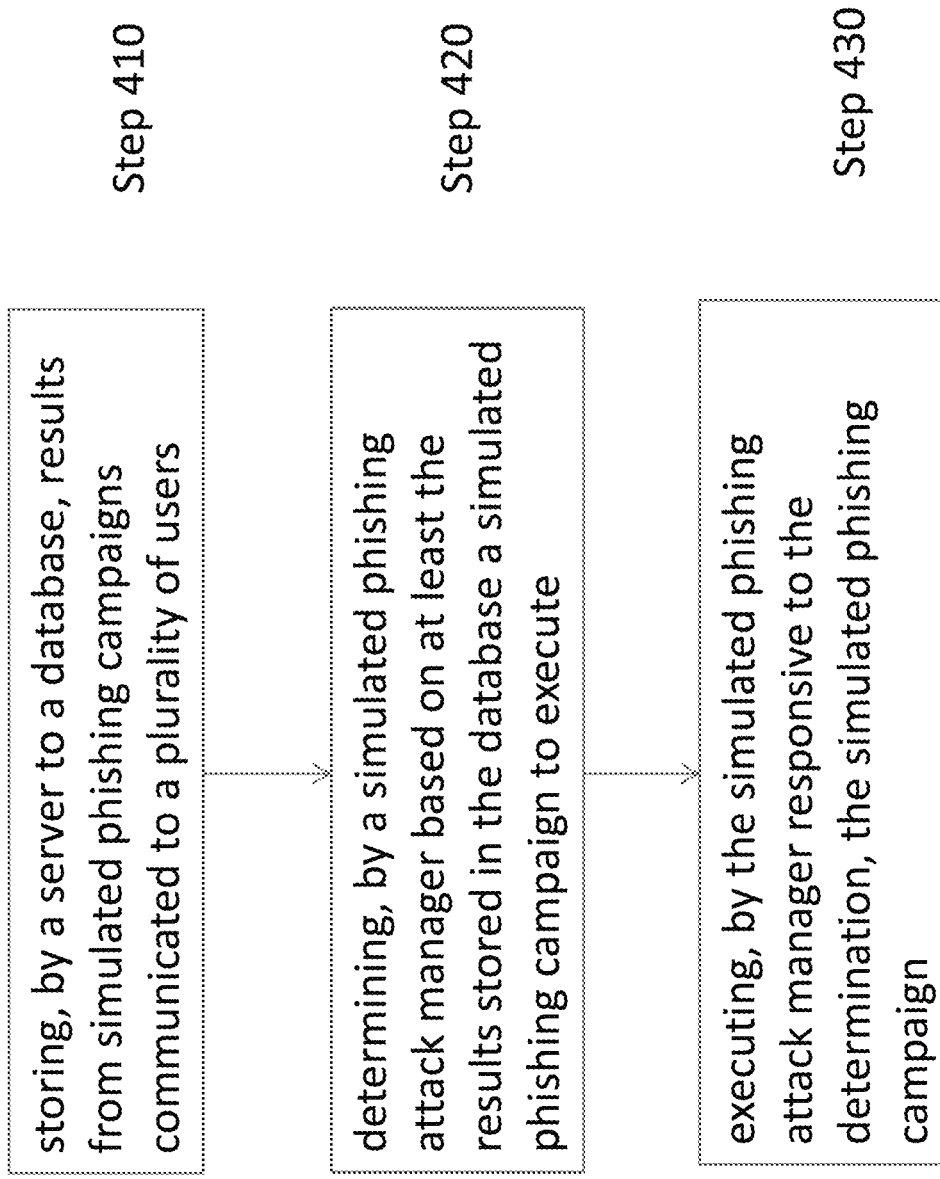
FIG. 4 is an flow diagram depicting an implementation of a method for performing a simulated phishing attack.

Referring now to FIG. 4, an example implementation of a method for determining a sequence and types of communications for a simulated phishing campaign is depicted. In brief overview, at step 410 a server stores in a database, results from a plurality of simulated phishing campaigns communicated to a plurality of users. At 420 a simulated phishing attack manager (also known as the phishing attack manager) determines based on at least the results stored in the database, a sequence and types of communications for a simulated phishing campaign. At step 430, the simulated phishing attack manager executes, responsive to the determination, the simulated phishing campaign comprising the sequence and type of communications.

In further detail of step 410, the database may store any type and form of results of previous simulated phishing campaigns. In some embodiments, the database may store results from simulated phishing campaigns communication to each of the plurality of users using a plurality of different sequences and types of communications. The server may store to the database may store results identifying behavior or activity of the users with respect to the simulated phishing campaigns, such as interacting with the plurality of simulated phishing campaigns; The server may store to the database may store the different types of communications that were used for the campaigns and associated with any of the result, which includes but is limited to a email, a text or SMS message, a phone call or an Internet based communication. The server may store to the database results that identify activity or behavior of the users including a combination of different types of communications and timing of communications associated with a predetermined action. The server may store to the database results from simulated phishing campaigns identifying behavior of when and how one or more of the users performed an action associated with one or more of the simulated phishing campaigns.

At step 420, the simulated phishing attack manager determines a simulated phishing campaign, such as a sequence and type of communications. The simulated phishing attack manager may make the determination based on at least a portion of any results stored in the database. The simulated phishing attack manager may applying one of an artificial intelligence or machine learning algorithm to the results in the database to make the determination. The simulated phishing attack manager may determine the sequence and type of communications having a predetermined likelihood of the plurality of users to take a predetermined action. The simulated phishing attack manager may determine for the campaign a timing of the sequence or the different types of communications. The simulated phishing attack manager may determine a combination of types of communications for the sequence of communications. The simulated phishing attack manager may determine that a particular type and timing of communications has a predetermined likelihood of a group of users to take a predetermined action. The simulated phishing attack manager may determine one or more of the following for the simulated phishing campaign: a quantity, frequency, type or combination of communications. The simulated phishing attack manager may generate, create, establish or modify a simulated phishing campaign based on one or more of the determinations.

At step 430, the simulated phishing attack manager may execute the simulated phishing campaign, such as responsive to the determination of step 420, or otherwise responsive to creating, generating, establishing or modifying simulated phishing campaign based on any of the determination. The simulated phishing attack manager may update the simulated phishing campaign currently executing to perform the sequence of communications and type(s) of communications. The simulated phishing attack manager may create the simulated phishing campaign to comprise the sequence and type of communications. A server may monitor results from the simulated phishing campaign. The simulated phishing attack manager may, responsive to monitoring, identify or determine a second sequence and type(s) of communications. The simulated phishing attack manager may adapt the simulated phishing campaign to use the second sequence and types of communications. The simulated phishing attack manager may generate a second simulated phishing campaign to comprise the second sequence and types of communications. The simulated phishing attack manager or server may store results from of any of these created or executed simulated phishing campaigns to the database to be used for subsequent, other or future determinations, machine learning or artificial intelligence to such results.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMS, RAMS, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed:

1. A method comprising:
   training, by one or more processors, an artificial intelligence model with results from a plurality of simulated phishing campaigns comprising a plurality of sequences of simulated phishing communications of different types of communications, wherein the artificial intelligence model is configured to take as input one or more attributes of a user and provide as output information identifying a sequence of different types of communications to cause the user to take a predetermined action responsive to one of the simulated phishing communications of the sequence;
   determining, by the one or more processors by providing one or more attributes of the user as input to the artificial intelligence model, the sequence of different types of communications to use for a simulated phishing campaign for the user that has a predetermined likelihood of causing the user to take the predetermined action responsive to one of the simulated phishing communications of the sequence; and
   communicating, by the one or more processors, a second simulated phishing communication of a second type of communication of the sequence to a device of the user at a predetermined time identified by the artificial intelligence model, the second simulated phishing communication communicated subsequent to and different from a first simulated phishing communication of a first type of communication of the sequence communicated to the device of the user.

2. The method of claim 1, wherein the first type of communication comprises at least one of email, text, short message service (SMS) message, a phone call or an Internet based communication and the second type of communication comprises one of email, text, SMS message, a phone call or an Internet based communication different from the first type of communication.

3. The method of claim 1, wherein the artificial intelligence model is configured to output information identifying timing between simulated phishing communications in the sequence of different types of communications.

4. The method of claim 1, further comprising determining, by the one or more processors from output of the artificial intelligence model, timing between simulated phishing communications in the sequence of different types of communications.

5. The method of claim 1, further comprising determining, by the one or more processors responsive to the artificial intelligence model, that a particular type of communication has the predetermined likelihood of causing the user to take the predetermined action.

6. The method of claim 1, further comprising determining, by the one or more processors responsive to the artificial intelligence model, that the first type of communication followed by the second type of communication has the predetermined likelihood of causing the user to take the predetermined action.

7. The method of claim 6, further comprising determining, by the one or more processors responsive to the artificial intelligence model, that the first type of communication followed by the second type of communication at a predetermined time has the predetermined likelihood of causing the user to take the predetermined action.

8. The method of claim 1, further comprising determining, by the one or more processors responsive to the artificial intelligence model, one of a frequency or quantity of communications for the sequence of types of communications to use for the user.

9. The method of claim 1, further comprising identifying, by the one or more processors, the sequence of types of communications from the output of the artificial intelligence model.

10. A system comprising:
one or more processors, coupled to memory;
an artificial intelligence model stored in memory and configured to take as input one or more attributes of a user and provide as output information identifying a sequence of different types of communications to cause the user to take a predetermined action responsive to one of the simulated phishing communications of the sequence;
wherein the one or more processors are configured to:
train the artificial intelligence model with results from a plurality of simulated phishing campaigns comprising a plurality of sequences of simulated phishing communications of different types of communications;
provide one or more attributes of the user as input to the artificial intelligence model to determine the sequence of different types of communications to use for a simulated phishing campaign for the user that has a predetermined likelihood of causing the user to take the predetermined action responsive to one of the simulated phishing communications of the sequence; and
communicate a second simulated phishing communication of a second type of communication of the sequence to a device of the user at a predetermined time identified by the artificial intelligence model, the second simulated phishing communication communicated subsequent to and different from a first simulated phishing communication of a first type of communication of the sequence communicated to the device of the user.

11. The system of claim 10, wherein the first type of communication comprises at least one of email, text, short message service (SMS) message, a phone call or an Internet based communication and the second type of communication comprises one of email, text, SMS message, a phone call or an Internet based communication different from the first type of communication.

12. The system of claim 10, wherein the artificial intelligence model is further configured to output information identifying timing between simulated phishing communications in the sequence of different types of communications.

13. The system of claim 10, wherein the one or more processors are further configured to determine from output of the artificial intelligence model, timing between simulated phishing communications in the sequence of different types of communications.

14. The system of claim 10, wherein the one or more processors are further configured to determine, responsive to the artificial intelligence model, that a particular type of communication has the predetermined likelihood of causing the user to take the predetermined action.

15. The system of claim 10, wherein the one or more processors are further configured to determine, responsive to the artificial intelligence model, that the first type of communication followed by the second type of communication has the predetermined likelihood of causing the user to take the predetermined action.

16. The system of claim 15, wherein the one or more processors are further configured to determine, responsive to the artificial intelligence model, that the first type of communication followed by the second type of communication at a predetermined time has the predetermined likelihood of causing the user to take the predetermined action.

17. The system of claim 10, wherein the one or more processors are further configured to determine, responsive to the artificial intelligence model, one of a frequency or quantity of communications for the sequence of types of communications to use for the user.

18. The system of claim 10, wherein the one or more processors are further configured to identify the sequence of types of communications from the output of the artificial intelligence model.

19. A system comprising:
one or more processors, coupled to memory;
an artificial intelligence model stored in memory and configured to take as input one or more attributes of a user and provide as output information identifying a sequence of different types of communications to cause the user to take a predetermined action responsive to one of the simulated phishing communications of the sequence;
wherein the one or more processors are configured to:
train the artificial intelligence model with results from a plurality of simulated phishing campaigns comprising a plurality of sequences of simulated phishing communications of different types of communications;
provide one or more attributes of the user as input to the artificial intelligence model to determine the sequence of different types of communications to use for a simulated phishing campaign for the user that has a predetermined likelihood of causing the user to take the predetermined action responsive to one of the simulated phishing communications of the sequence; and
communicate a second simulated phishing communication of a second type of communication of the sequence to a device of the user subsequent to and different from a first simulated phishing communication of a first type of communication of the sequence communicated to the device of the user; and
wherein the one or more processors are configured to determine, responsive to the artificial intelligence model, that the first type of communication followed by the second type of communication has the predetermined likelihood of causing the user to take the predetermined action.

20. The system of claim 19, wherein the one or more processors are further configured to determine, responsive to the artificial intelligence model, that the first type of communication followed by the second type of communication at a predetermined time has the predetermined likelihood of causing the user to take the predetermined action.

* * * * *